(12) United States Patent
Maruyama et al.

(10) Patent No.: US 12,103,211 B2
(45) Date of Patent: Oct. 1, 2024

(54) PLASTICIZING DEVICE, INJECTION MOLDING DEVICE, AND THREE-DIMENSIONAL MODELING DEVICE

(71) Applicant: Seiko Epson Corporation, Toyko (JP)

(72) Inventors: Hidenobu Maruyama, Azumino (JP); Kenta Anegawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/331,754

(22) Filed: May 27, 2021

(65) Prior Publication Data

US 2021/0370567 A1 Dec. 2, 2021

(30) Foreign Application Priority Data

May 28, 2020 (JP) .................. 2020-093026

(51) Int. Cl.
*B29C 64/209* (2017.01)
*B29C 45/47* (2006.01)
(Continued)

(52) U.S. Cl.
CPC .............. *B29C 45/74* (2013.01); *B29C 45/47* (2013.01); *B29C 45/60* (2013.01); *B29C 45/62* (2013.01);
(Continued)

(58) Field of Classification Search
CPC ....... B29C 45/62; B29C 45/361; B29C 45/68; B29C 45/875; B29C 45/78; B29C 45/1775
See application file for complete search history.

(56) References Cited

U.S. PATENT DOCUMENTS 2,567,147 A * 9/1951 Cousino .................. B29C 45/47
425/DIG. 115
2,705,342 A 4/1955 Hendry
(Continued)

FOREIGN PATENT DOCUMENTS

CN 102791460 A 11/2012
CN 102490309 B 11/2013
(Continued)

OTHER PUBLICATIONS

Shen Kaizhi -Beijing Plastic Product Design Methods and Application Examples:; published by National Defense Industry Press; ISBN 7-118-04661-2; Jan. 2007 (total 11 pages).

*Primary Examiner* — Armand Melendez
(74) *Attorney, Agent, or Firm* — Harness, Dickey & Pierce, P.L.C.

(57) ABSTRACT

There is provided a plasticizing device including a rotor which rotates around a rotational axis, and has a groove forming surface provided with a groove, a barrel which is opposed to the groove forming surface, and has a communication hole, and a first heating section configured to heat a material fed between the rotor and the barrel, wherein the material fed between the rotor and the barrel is plasticized and discharged from the communication hole due to a rotation of the rotor and heating by the first heating section. In the plasticizing device, the first heating section includes a first portion configured to house a first heat source, includes a second portion which is disposed closer to the groove forming surface than the first portion in an axial direction of the rotational axis, and which has a shape surrounding the communication hole when viewed along the axial direction, and is configured so that heat by the first heat source is transferred to the material between the rotor and the barrel via the second portion.

13 Claims, 10 Drawing Sheets

(51) Int. Cl.
  *B29C 45/60* (2006.01)
  *B29C 45/62* (2006.01)
  *B29C 45/74* (2006.01)
  *B29C 64/295* (2017.01)
  *B29C 64/314* (2017.01)
  *B33Y 30/00* (2015.01)
  *B33Y 40/10* (2020.01)

(52) U.S. Cl.
  CPC .......... *B29C 64/209* (2017.08); *B29C 64/295* (2017.08); *B29C 64/314* (2017.08); *B33Y 30/00* (2014.12); *B33Y 40/10* (2020.01)

(56) References Cited

U.S. PATENT DOCUMENTS

| | | |
|---|---|---|
| 3,009,685 A | 11/1961 | Rettig |
| 3,577,841 A | 5/1971 | Ledoux et al. |
| 3,866,669 A | 2/1975 | Gardiner |
| 3,944,191 A | 3/1976 | Kasamatsu |
| 3,954,366 A | 5/1976 | Fields |
| 4,272,466 A | 6/1981 | Harris |
| 4,531,308 A | 7/1985 | Neilson et al. |
| 4,649,262 A | 3/1987 | Yoshikawa |
| 5,121,329 A | 6/1992 | Crump |
| 6,033,205 A | 3/2000 | Chiu |
| 6,146,575 A | 11/2000 | Huston |
| 7,846,369 B2 | 12/2010 | Akopyan |
| 2003/0075833 A1 | 4/2003 | Thomson |
| 2007/0063378 A1 | 3/2007 | O'Donoghue |
| 2008/0213419 A1* | 9/2008 | Skubic ................. B29C 48/865 415/72 |
| 2009/0208600 A1 | 8/2009 | Akamatsu |
| 2011/0159139 A1 | 6/2011 | Galati et al. |
| 2015/0051339 A1 | 2/2015 | Brunner et al. |
| 2017/0008230 A1 | 1/2017 | Yuyama |
| 2017/0210069 A1 | 7/2017 | Stubenruss |
| 2017/0239868 A1 | 8/2017 | Strange et al. |
| 2017/0291364 A1 | 10/2017 | Womer |
| 2018/0236705 A1 | 8/2018 | Conrad |
| 2018/0297258 A1 | 10/2018 | Zhu |
| 2018/0297259 A1 | 10/2018 | Chen et al. |
| 2018/0311894 A1 | 11/2018 | Saito et al. |
| 2019/0061243 A1 | 2/2019 | Saito et al. |
| 2019/0168455 A1 | 6/2019 | Besim et al. |
| 2019/0358903 A1 | 11/2019 | Watanabe et al. |
| 2020/0094480 A1 | 3/2020 | Yamasaki |
| 2020/0139629 A1* | 5/2020 | Yokota ................. B29C 64/255 |
| 2020/0324337 A1 | 10/2020 | Lieberwirth et al. |
| 2020/0338824 A1* | 10/2020 | Cardon .................... B29B 7/60 |
| 2021/0031422 A1 | 2/2021 | Yamashita |
| 2021/0031423 A1 | 2/2021 | Yamashita |
| 2021/0031444 A1 | 2/2021 | Yamashita |
| 2021/0162642 A1 | 6/2021 | Anegawa |
| 2021/0370567 A1 | 12/2021 | Maruyama et al. |

FOREIGN PATENT DOCUMENTS

| | | | |
|---|---|---|---|
| CN | 111152451 A * | 5/2020 | ............ B29B 7/429 |
| EP | 1733863 A1 | 12/2006 | |
| JP | S61-235120 A | 10/1986 | |
| JP | H09-070864 A | 3/1997 | |
| JP | 3052603 U | 9/1998 | |
| JP | H10-249892 A | 9/1998 | |
| JP | 2000-127214 A | 5/2000 | |
| JP | 2004-314399 A | 11/2004 | |
| JP | 2009-269182 A | 11/2009 | |
| JP | 2010-000752 A | 1/2010 | |
| JP | 2010-241016 A | 10/2010 | |
| JP | 2013-184387 A | 9/2013 | |
| JP | 2018-079652 A | 5/2018 | |
| JP | 2019-202458 A | 11/2019 | |
| JP | 2020-075397 A | 5/2020 | |
| WO | 2012120118 A1 | 9/2012 | |
| WO | 2015-129733 A1 | 9/2015 | |

\* cited by examiner

PLASTICIZING DEVICE, INJECTION MOLDING DEVICE, AND THREE-DIMENSIONAL MODELING DEVICE The present application is based on, and claims priority from JP Application Serial Number 2020-093026, filed May 28, 2020, the disclosure of which is hereby incorporated by reference herein in its entirety.

BACKGROUND

1. Technical Field

The present disclosure relates to a plasticizing device, an injection molding device, and a three-dimensional modeling device.

2. Related Art

In JP-A-2009-269182 (Document 1), related to a plasticizing device for plasticizing a material to feed the material as a plasticized material, there is disclosed a device provided with a rotor having an end surface provided with spiral grooves, and a barrel having a communication hole at the center thereof and making contact with the end surface of the rotor. In such a plasticizing device, the material is heated by a heating device such as a heater while being conveyed toward a central part from the periphery of the rotor due to a rotation of the rotor between the rotor and the barrel to thereby be plasticized, and is then discharged from the communication hole.

In such a plasticizing device as in Document 1 described above, there occurs a temperature variation in a circumferential direction of the rotor in some cases between the rotor and the barrel depending on, for example, the shape of the heater or arrangement positions. When the temperature variation occurs in the circumferential direction of the rotor between the rotor and the barrel, there is a possibility that the plasticization state of the material varies depending on the orientation from the central part of the rotor even when, for example, the distance from the central part of the rotor is the same, and thus, the plasticization state and the delivery amount of the plasticized material thus generated are not stabilized.

SUMMARY

According to a first aspect of the present disclosure, there is provided a plasticizing device including a rotor which rotates around a rotational axis, and has a groove forming surface provided with a groove, a barrel which is opposed to the groove forming surface, and has a communication hole, and a first heating section configured to heat a material fed between the rotor and the barrel, wherein the material fed between the rotor and the barrel is plasticized and discharged from the communication hole due to a rotation of the rotor and heating by the first heating section. In the plasticizing device, the first heating section includes a first portion configured to house a first heat source, includes a second portion which is disposed closer to the groove forming surface than the first portion in an axial direction of the rotational axis, which has a shape surrounding the communication hole when viewed in the axial direction, and which connects to the first portion, and is configured so that heat by the first heat source is transferred to the material between the rotor and the barrel via the second portion.

According to a second aspect of the present disclosure, there is provided an injection molding device. The injection molding device includes the plasticizing device according to the first aspect described above, and an injection nozzle which is communicated with the communication hole, and is configured to inject the material plasticized into a molding die.

According to a third aspect of the present disclosure, there is provided a three-dimensional modeling device. The three-dimensional modeling device includes the plasticizing device according to the first aspect described above, and an ejection nozzle which is communicated with the communication hole, and is configured to eject the material plasticized toward a stage.

DESCRIPTION OF EXEMPLARY EMBODIMENTS

A. First Embodiment

Figure 1:
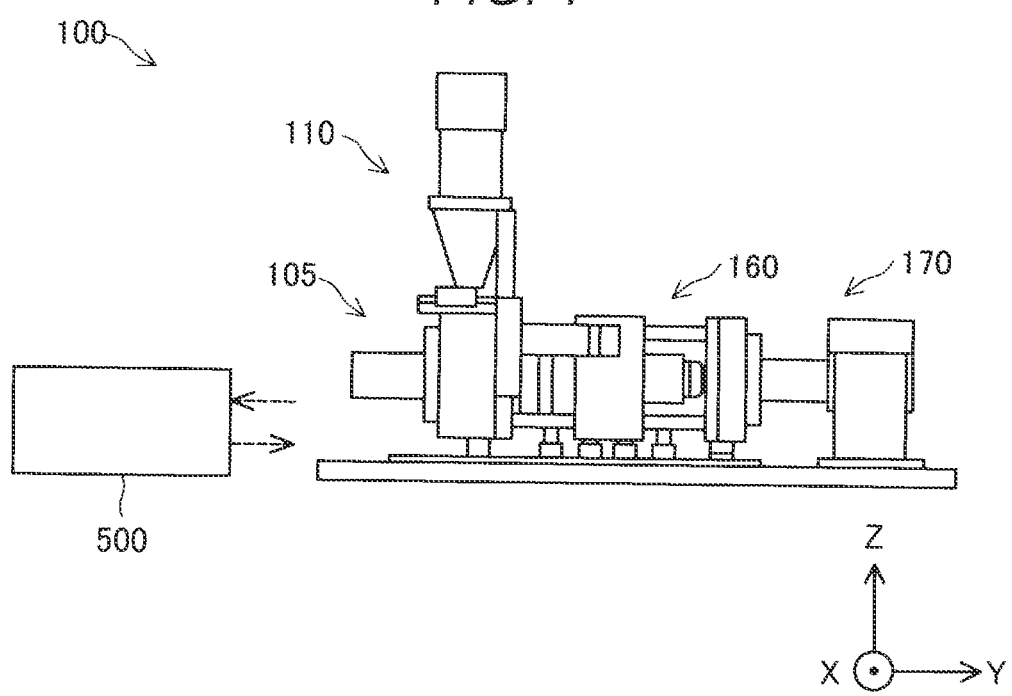
FIG. 1 is a diagram showing a schematic configuration of an injection molding device according to a first embodiment.

FIG. 1 is a diagram showing a schematic configuration of an injection molding device 100 according to the present embodiment. In FIG. 1, there are shown the arrows along X, Y, and Z directions perpendicular to each other, respectively. The X, Y, and Z directions are directions along an X axis, a Y axis, and a Z axis as three spatial axes perpendicular to each other, and each include both of a direction toward one side along the X axis, the Y axis, or the Z axis, and the opposite direction thereof. The X axis and the Y axis are axes along a horizontal plane, and the Z axis is an axis along a vertical line. In other drawings, there are arbitrarily shown the arrows along the X, Y, and Z directions, respectively. The X, Y, and Z directions in FIG. 1 and the X, Y, and Z directions in other drawings represent the same directions, respectively.

The injection molding device 100 is provided with an injection unit 105, a material feeding section 110, a mold part 160, a mold clamping device 170, and a control section 500. The injection molding device 100 plasticizes a material fed from the material feeding section 110 to generate a plasticized material, and then injects the plasticized material to the mold part 160 to thereby mold a molded object using the injection unit 105.

Figure 2:
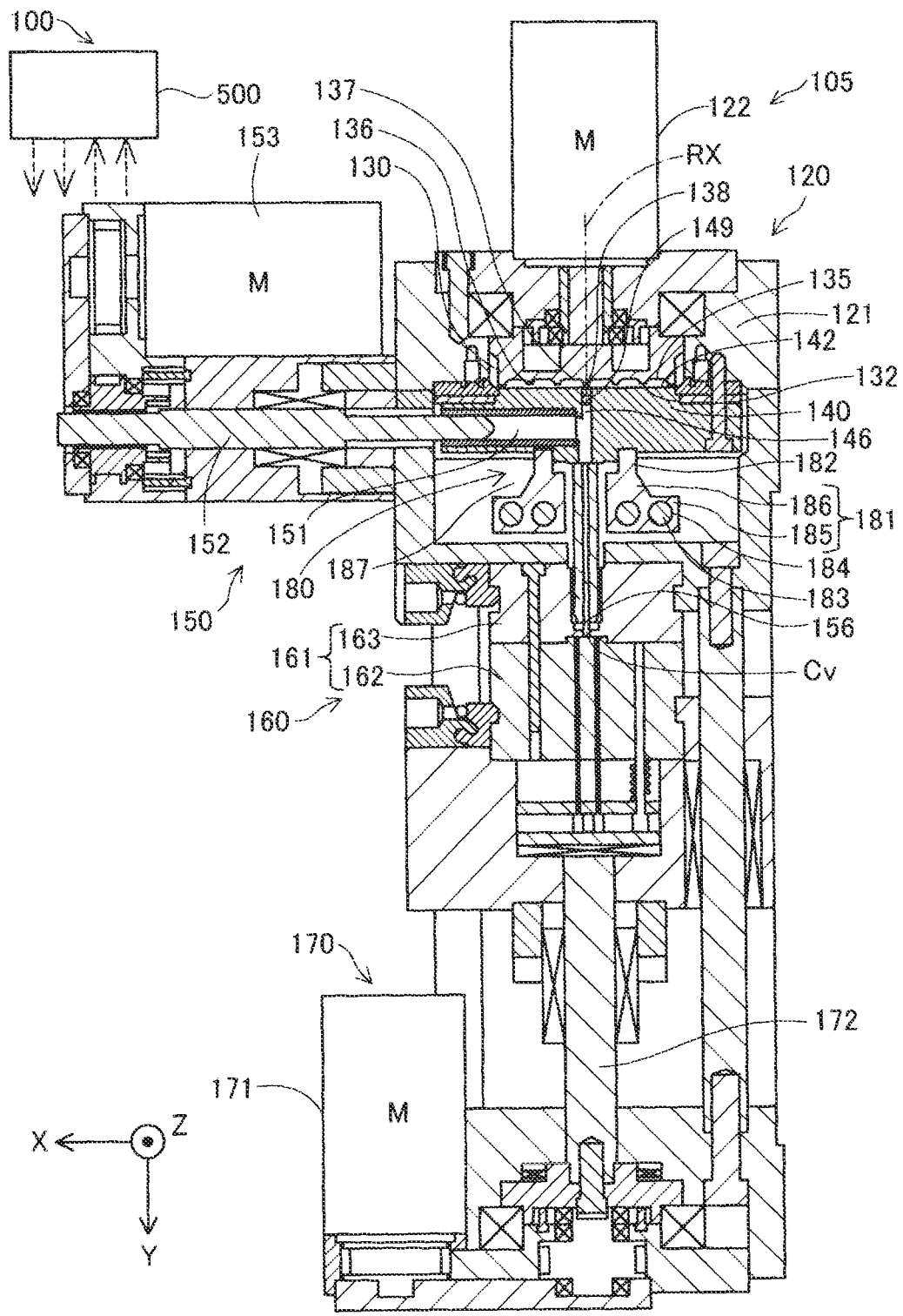
FIG. 2 is a cross-sectional view showing the schematic configuration of the injection molding device according to the first embodiment.

FIG. 2 is a cross-sectional view showing a schematic configuration of the injection molding device 100. In FIG. 2, there are shown the injection unit 105, the mold part 160, the mold clamping device 170, and the control section 500 of the injection molding device 100. The injection unit 105 is provided with a plasticizing device 120, an injection control section 150, and an injection nozzle 156.

The control section 500 is a device for performing control of the injection unit 105 and the mold clamping device 170. The control section 500 is constituted by, for example, a computer provided with one or more processors, a main storage device, and an input/output interface, and a combination of a plurality of circuits.

The material feeding section 110 shown in FIG. 1 is communicated with the plasticizing device 120 shown in FIG. 2. The material feeding section 110 feeds the material to the plasticizing device 120. The material feeding section 110 in the present embodiment is formed of a hopper. In the material feeding section 110, there is contained the material in the form of a pellet, a powder, or the like.

As shown in FIG. 2, the plasticizing device 120 is provided with a rotor case 121, a drive motor 122, a rotor 130, a barrel 140, a check valve 149, and a first heating section 180. The plasticizing device 120 plasticizes at least a part of the material fed from the material feeding section 110 to generate the plasticized material in a paste form having fluidity, and then guides the plasticized material to the injection control section 150. The term "plasticize" means that the material having a thermoplastic property is heated at a temperature no lower than the glass-transition point to thereby be softened, and thus, the fluidity is developed. The term "melt" not only means that the material having a thermoplastic property is heated at a temperature no lower than the melting point to thereby be in a liquid form, but also means that the material having the thermoplastic property is plasticized. It should be noted that the rotor 130 in the present embodiment is called a "scroll" or a "flat screw" in some cases, or is simply called a "screw" in some cases.

The rotor 130 has a substantially cylindrical shape smaller in height in a direction along a central axis RX than the diameter. The rotor 130 is housed in a space surrounded by the rotor case 121 and the barrel 140. The rotor 130 has a groove forming surface 132 provided with grooves 135 on a surface opposed to the barrel 140. Specifically, the groove forming surface 132 is opposed to an opposed surface 142 of the barrel 140. The groove forming surface 132 is provided with protruding line parts 136 each having a curved shape. It should be noted that the central axis RX is referred to as a rotational axis of the rotor 130 in some cases. In FIG. 2, the central axis RX is represented by a dashed-dotted line. Further, a direction along the central axis RX is referred to as an axial direction in some cases.

To a surface of the rotor 130 at the opposite side to the groove forming surface 132, there is coupled the drive motor 122. Due to the torque generated by the drive motor 122, the rotor 130 rotates around the central axis RX as the rotational axis. The drive motor 122 is driven under the control by the control section 500. It should be noted that the drive motor 122 is not required to directly be coupled to the rotor 130. For example, it is possible for the rotor 130 and the drive motor 122 to be coupled to each other via a reduction mechanism. In this case, it is possible to adopt a configuration in which, for example, the drive motor 122 is coupled to a planet gear of the reduction mechanism having a planetary gear train, and the rotor 130 is coupled to a sun gear.

Figure 3:
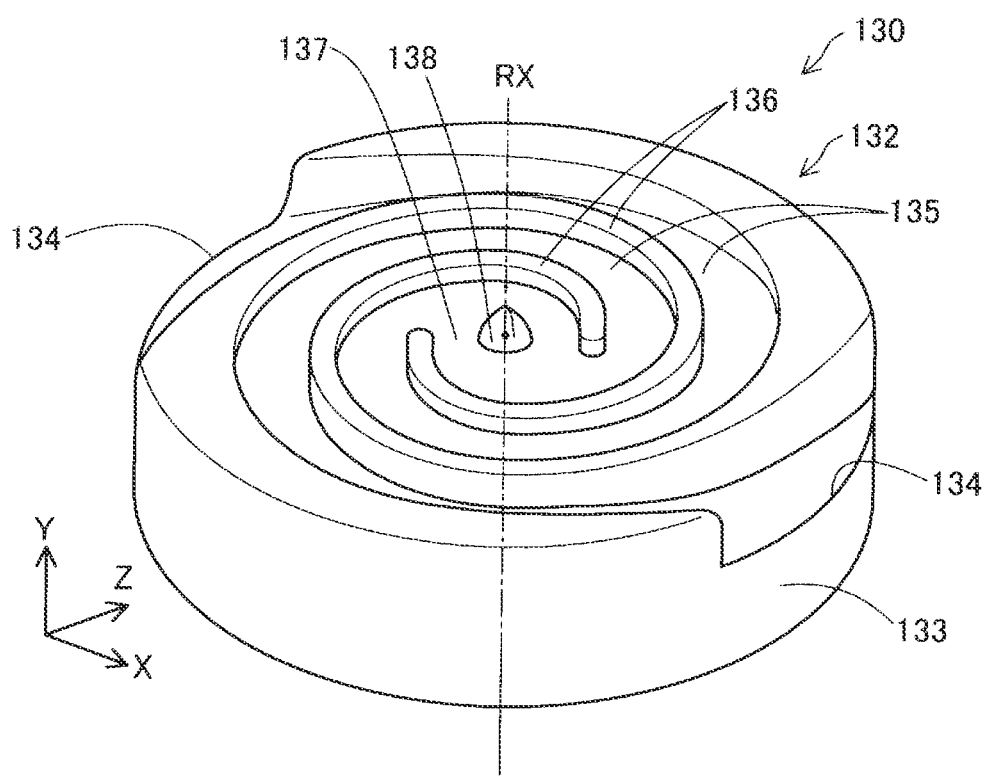
FIG. 3 is a perspective view showing a configuration at a groove forming surface side of a rotor.

FIG. 3 is a perspective view showing a configuration at the groove forming surface 132 side of the rotor 130. In FIG. 3, a position of the central axis RX of the rotor 130 is represented by the dashed-dotted line. As described above, the groove forming surface 132 is provided with the grooves 135.

The grooves 135 of the rotor 130 each form a so-called scrolling groove. The grooves 135 each extend in a vertical manner from a central part 137 toward an outer circumference of the rotor 130 so as to draw an arc. The grooves 135 can also be formed so as to extend forming an involute-curved shape or a spiral shape. The groove forming surface 132 is provided with the protruding line parts 136 each constituting a sidewall part of the groove 135, and extending along each of the grooves 135. The grooves 135 each continue to a material introduction port 134 formed on a side surface 133 of the rotor 130. The material introduction ports 134 are each a portion for taking the material in the groove 135. The material fed from the material feeding section 110 is fed between the rotor 130 and the barrel 140 via the material introduction ports 134.

The central part 137 of the groove forming surface 132 of the rotor 130 is formed as a recess to which one ends of the grooves 135 are coupled. As shown in FIG. 2, the central part 137 is opposed to a communication hole 146 provided to the opposed surface 142 of the barrel 140. The central part 137 crosses the central axis RX.

The rotor 130 in the present embodiment is provided with a retention inhibition part 138 protruding toward the communication hole 146 at the central part 137. In the present embodiment, the retention inhibition part 138 has a substantially conical shape, and a central axis of the retention inhibition part 138 substantially coincides with the central axis RX of the rotor 130. A tip of the retention inhibition part 138 is disposed at an inner side of the communication hole 146 from an opening end of the communication hole 146 in the opposed surface 142. Since the plasticized material in the central part 137 is efficiently guided by the retention inhibition part 138 to the communication hole 146, the retention of the plasticized material is prevented. The retention of the plasticized material is also referred to as "stagnation" in some cases.

In FIG. 3, there is shown an example of the rotor 130 having two grooves 135 and two protruding line parts 136. The number of the grooves 135 and the number of the protruding line parts 136 provided to the rotor 130 are not limited to two. The rotor 130 can be provided with just one groove 135, or can also be provided with a plurality of, namely three or more, grooves 135. Further, it is also possible to dispose an arbitrary number of protruding line parts 136 in accordance with the number of the grooves 135.

In FIG. 3, there is illustrated an example of the rotor 130 having the material introduction ports 134 formed at two places. The number of the places where the material introduction ports 134 are disposed in the rotor 130 is not limited to two. It is possible to dispose the material introduction port 134 at just one place in the rotor 130, or to dispose the material introduction ports 134 at a plurality of places, namely three or more places, in the rotor 130.

Figure 4:
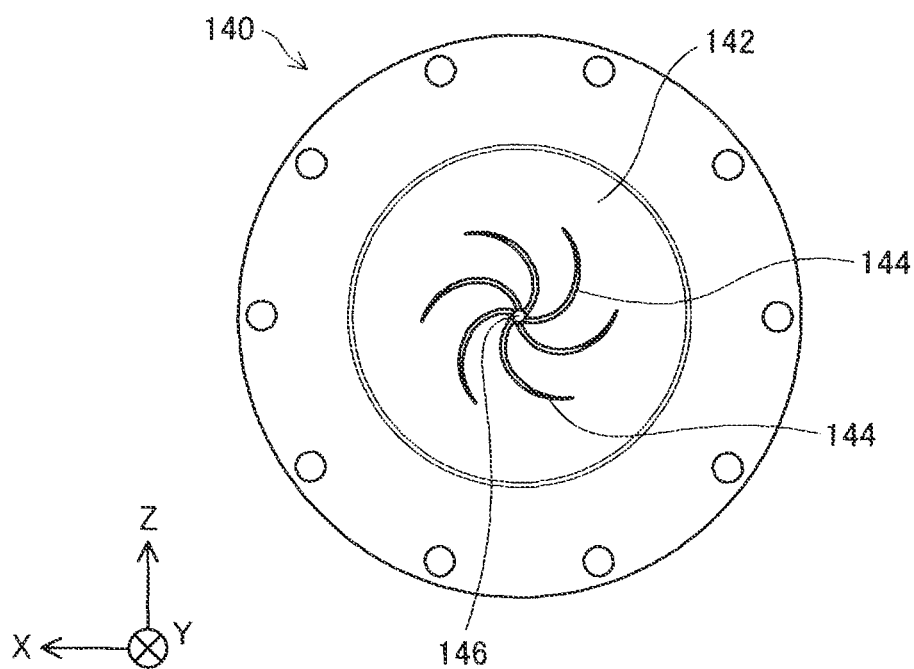
FIG. 4 is an explanatory diagram showing a configuration at an opposed surface side of a barrel.

FIG. 4 is an explanatory diagram showing a configuration at the opposed surface 142 side of the barrel 140. As described above, the opposed surface 142 is a surface opposed to the groove forming surface 132 of the rotor 130. At the center of the opposed surface 142, there is disposed the communication hole 146 communicated with the injection nozzle 156 shown in FIG. 2. On the periphery of the communication hole 146 in the opposed surface 142, there is formed a plurality of guide grooves 144. Each of the guide grooves 144 is coupled to the communication hole 146 in one end, and extends from the communication hole 146 forming a spiral shape. Each of the guide grooves 144 has a function of guiding the plasticized material to the communication hole 146. It should be noted that it is not required to provide the guide grooves 144 to the barrel 140.

As shown in FIG. 2, the check valve 149 is disposed inside the communication hole 146. The check valve 149 inhibits a reverse flow of the plasticized material from the communication hole 146 toward the central part 137 and the grooves 135 of the rotor 130.

As shown in FIG. 2, the first heating section 180 has a first portion 181, a second portion 182, and first heat sources 183. The first heating section 180 heats the material fed between the rotor 130 and the barrel 140 with the heat of the first heat sources 183. In the present embodiment, the output of the first heat sources 183 is controlled by the control section 500. The details of the configuration of the first heating section 180 will be described later.

The plasticizing device 120 heats the material while conveying the material toward the communication hole 146 due to the rotation of the rotor 130 and the heating by the first heating section 180 described above to thereby form the plasticized material, and then discharges the plasticized material thus formed from the communication hole 146. In particular, the plasticized material in the communication hole 146 is measured in weight by the injection control section 150, and is then fed to the injection nozzle 156.

As shown in FIG. 2, the injection control section 150 is provided with a cylinder 151, a plunger 152, and a plunger drive section 153. The cylinder 151 is a member which has a substantially cylindrical shape, and is coupled to the communication hole 146 of the barrel 140. The plunger 152 moves inside the cylinder 151. The plunger 152 is driven by the plunger drive section 153 constituted by a motor, gears, and so on. The plunger drive section 153 is controlled by the control section 500.

The injection control section 150 slides the plunger 152 in the cylinder 151 to thereby perform a weighing operation and an injection operation under the control by the control section 500. The weighing operation means an operation of moving the plunger 152 toward the +X direction of getting away from the communication hole 146 to thereby guide the plasticized material in the communication hole 146 to the inside of the cylinder 151, and then measuring the weight of the plasticized material inside the cylinder 151. The injection operation means an operation of moving the plunger 152 toward the −X direction of coming closer to the communication hole 146 to thereby inject the plasticized material located inside the cylinder 151 into a molding die via the injection nozzle 156.

As described above, the injection nozzle 156 is communicated with the communication hole 146. By performing the weighing operation and the injection operation described above, the plasticized material measured in weight in the cylinder 151 is fed from the injection control section 150 to the injection nozzle 156 via the communication hole 146, and is then injected from the injection nozzle 156 into the mold part 160. It should be noted that, for example, the injection molding device 100 can be provided with a heater for warming the injection nozzle 156. By appropriately warming the injection nozzle 156, it is possible to keep the fluidity of the plasticized material inside the injection nozzle 156 to improve the molding accuracy of the molded object.

The mold part 160 has a molding die 161. The plasticized material fed to the injection nozzle 156 is injected from the injection nozzle 156 into a cavity Cv of the molding die 161. Specifically, the molding die 161 has a movable mold 162 and a stationary mold 163 opposed to each other, and has the cavity Cv between the movable and stationary molds. The cavity Cv is a space corresponding to a shape of the molded object. In the present embodiment, the movable mold 162 and the stationary mold 163 are each formed of a metal material. It should be noted that it is possible for the movable mold 162 and the stationary mold 163 to be formed of a ceramics material or a resin material.

The mold clamping device 170 is provided with a mold drive section 171 and a ball screw part 172. The mold drive section 171 is constituted by a motor, gears, and so on, and is coupled to the movable mold 162 via the ball screw part 172. The drive by the mold drive section 171 is controlled by the control section 500. The ball screw part 172 transmits the power of the drive by the mold drive section 171 to the movable mold 162. The mold clamping device 170 moves the movable mold 162 using the mold drive section 171 and the ball screw part 172 under the control by the control section 500 to thereby perform opening and closing of the mold part 160.

Figure 5:
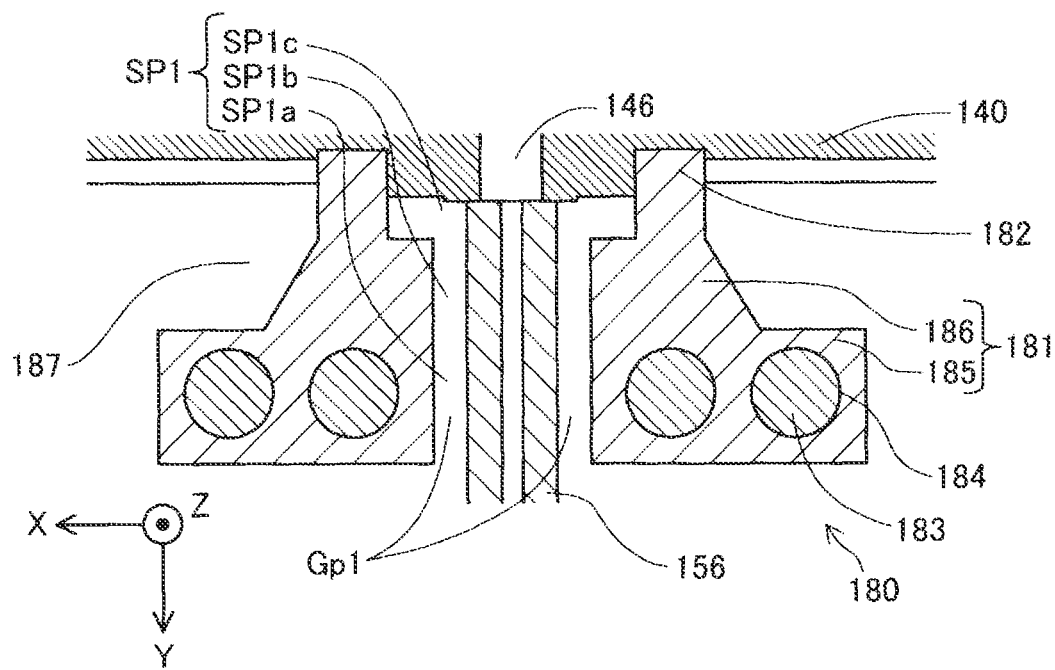
FIG. 5 is a diagram showing a cross-sectional surface of a first heating section in the first embodiment.
Figure 6:
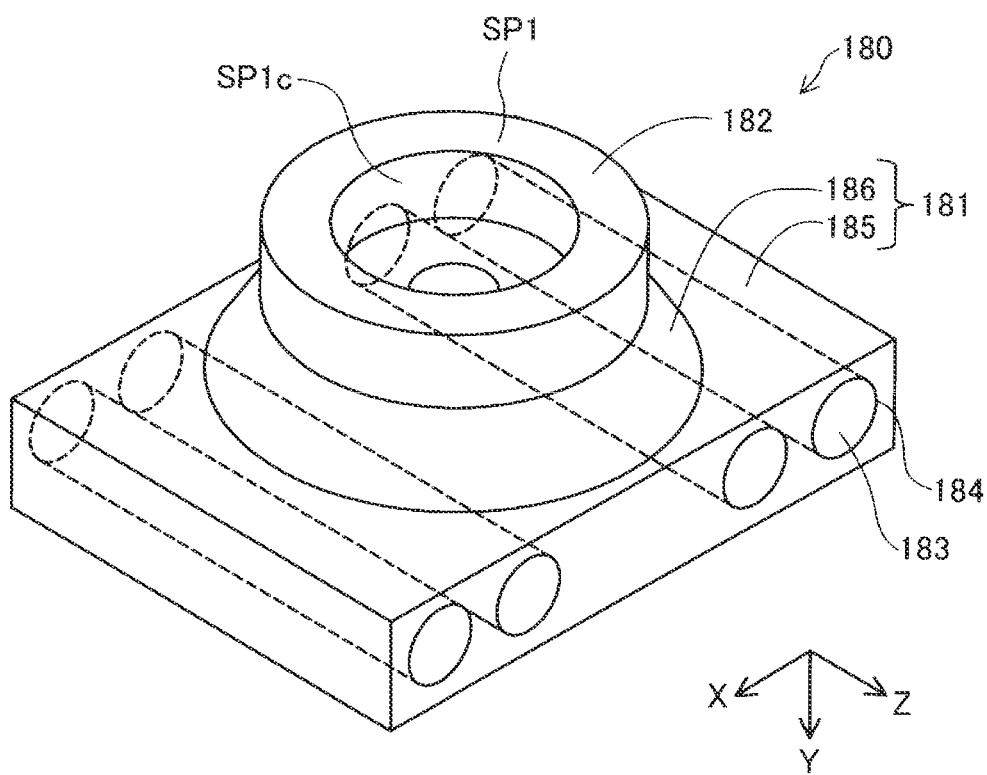
FIG. 6 is a perspective view of the first heating section in the first embodiment.

FIG. 5 is a diagram showing a cross-sectional surface of the first heating section 180. FIG. 6 is a perspective view of the first heating section 180. It should be noted that the injection nozzle 156 is omitted in FIG. 6 in order to make it easy to understand the configuration. Further, in FIG. 6, a part of each of the first heat sources 183 is represented by dotted lines.

As shown in FIG. 2 and FIG. 5, the first heating section 180 in the present embodiment is disposed below the barrel 140. As described above, the first heating section 180 has the first portion 181, the second portion 182, and the first heat sources 183.

The first portion 181 houses the first heat sources 183. Specifically, the first portion 181 has a first housing part 185 and a first continuing part 186. The first housing part 185 is a portion for housing the first heat sources 183. The first continuing part 186 is a portion for connecting the first housing part 185 of the first portion 181 and the second portion 182. In other words, in the present embodiment, the first portion 181 and the second portion 182 connect to each other via the first continuing part 186.

As shown in FIG. 5 and FIG. 6, the first housing part 185 of the first portion 181 in the present embodiment has a flat quadrangular prismatic shape low in height along the Y direction as the axial direction. The first housing part 185 is provided with four first through holes 184 penetrating the first housing part 185 in the Z direction. The four first through holes 184 each have a substantially cylindrical shape, and are arranged along the X direction. Further, in a central portion of the first housing part 185 when viewing the first housing part 185 along the Y direction, there is formed a space SP1a which has a substantially cylindrical shape and penetrates the first housing part 185 in the Y direction.

As shown in FIG. 2 and FIG. 5, the first portion 181 in the present embodiment is disposed at the +Y direction side of the barrel 140 without having contact with the barrel 140. More particularly, between the first portion 181, and the barrel 140 and the rotor 130, there is disposed a heat-insulating part 187. Specifically, as the heat-insulating part 187, there is disposed an air gap between the first portion 181 and the barrel 140.

The first heat sources 183 are each a heat source of the first heating section 180 wherein the heat sources are housed in the first portion 181. In the present embodiment, the first heat sources 183 are housed in the first housing part 185. It should be noted that in FIG. 6, a portion of each of the first heat sources 183 which is housed in the first housing part 185 and is not exposed outside is represented by the dotted lines. As shown in FIG. 6, the first heat sources 183 in the present embodiment are each a rod-like heater. Specifically, the first heat sources 183 each have a substantially cylindrical shape corresponding to the shape of the first through hole 184 described above. The first heat sources 183 are inserted one-by-one into the first through holes 184 to thereby be housed in the first housing part 185. It should be noted that it is possible to adopt a configuration in which, for example, the first heat sources 183 are detachably attached to the first housing part 185.

As shown in FIG. 5 and FIG. 6, the second portion 182 has a flat substantially cylindrical shape low in height along the Y direction as the axial direction. In a central portion of the second portion 182 when viewing the second portion 182 along the Y direction, there is formed a space SP1c which has a substantially cylindrical shape and penetrates the second portion 182 in the Y direction. As shown in FIG. 2 and FIG. 5, the second portion 182 is a portion disposed closer to the groove forming surface 132 than the first portion 181 in the Y direction as the axial direction. The second portion 182 in the present embodiment is partially embedded in the barrel 140 to thereby be fixed.

As shown in FIG. 5 and FIG. 6, the first continuing part 186 in the present embodiment is a portion disposed between the first housing part 185 and the second portion 182, and has a substantially circular truncated conical shape. In a central portion of the first continuing part 186 when viewing the first continuing part 186 along the Y direction, there is formed a space SP1b which has a substantially cylindrical shape and penetrates the first continuing part 186 in the Y direction.

As shown in FIG. 5 and FIG. 6, the first heating section 180 is provided with a space SP1 penetrating the first heating section 180 in the Y direction. Specifically, the space SP1a and the space SP1b provided to the first portion 181 and the space SP1c provided to the second portion 182 are communicated with each other to thereby form the space SP1. In the present embodiment, in this space SP1, there is inserted the injection nozzle 156. Therefore, in at least a part in the Y direction of the injection nozzle 156, the periphery at the X direction side and the Y direction side of the injection nozzle 156 is surrounded by the first portion 181. Thus, since the heat of the first heat sources 183 housed in the first portion 181 is transferred to the injection nozzle 156, it is possible to warm the injection nozzle 156 with the heat of the first heat sources 183. Further, for example, when a nozzle heater for warming the injection nozzle 156 is provided, since it is possible to warm the injection nozzle 156 while suppressing the output of the nozzle heater, it is possible to enhance the overall thermal efficiency of the injection molding device 100. It should be noted that in the present embodiment, between the injection nozzle 156 and the first portion 181, there is disposed a gap Gp1. By providing the gap Gp1, excessive thermal transfer from the first heating section 180 to the injection nozzle 156 is prevented, and thus, the temperature of the injection nozzle 156 is prevented from excessively rising.

The first heating section 180 is configured to transfer the heat by the first heat sources 183 to the material fed between the rotor 130 and the barrel 140 via the second portion 182 due to the configuration described above. Specifically, in the present embodiment, the heat by the first heat sources 183 is first transferred to the first portion 181 which houses the first heat sources 183. The heat transferred to the first portion 181 is transferred to the second portion 182. The heat transferred to the second portion 182 is transferred to the barrel 140, and is further transferred to the opposed surface 142 of the barrel 140. Thus, the heat by the first heat sources 183 is transferred to an area between the rotor 130 and the barrel 140, and is thus transferred to the material fed between the rotor 130 and the barrel 140.

It should be noted that as described above, in the present embodiment, between the first portion 181, and the barrel 140 and the rotor 130, there is disposed the heat-insulating part 187. Therefore, there is prevented the heat transfer without the intervention of the second portion 182 from the first heat sources 183 to the material between the rotor 130 and the barrel 140. Further, as shown in FIG. 2, since in the present embodiment, the air gap is disposed in the entire periphery of the first portion 181, there is prevented the thermal influence of the unintended heat transfer to a variety of components constituting the injection molding device 100.

Further, as described above, the second portion 182 in the present embodiment is partially embedded in the barrel 140. In contrast, in another embodiment, the second portion 182 is not required to be embedded in the barrel 140, and it is possible for the second portion 182 to, for example, be fixed via an adhesive or a bolt, or be welded so as to make contact with a surface at the opposite side to the opposed surface 142 of the barrel 140 from the +Y direction. Even in such a case, the heat by the first heat sources 183 is transferred via the second portion 182 to the material fed between the rotor 130 and the barrel 140.

In the present embodiment, the first portion 181 and the second portion 182 constituting the first heating section 180 are integrally formed of stainless steel. In another embodiment, the first heating section 180 is not required to be formed of stainless steel, and can be formed of, for example, other metal. For example, it is possible for the rotor 130 and the barrel 140 to be formed of stainless steel, and it is possible for the first heating section 180 to be formed of aluminum having higher thermal conductivity than that of stainless steel. In this case, it is possible for the first heating section 180 to efficiently transfer the heat by the first heat sources 183 to the material via the second portion 182. Further, it is possible for the first portion 181 and the second portion 182 constituting the first heating section 180 to be configured separately from each other, and it is possible for the members thus separated from each other to be fixed to each other with a bolt or an adhesive. In this case, it is possible for the first portion 181 and the second portion 182 to be formed of respective materials different from each other. Similarly, it is possible for the first housing part 185 and the first continuing part 186 constituting the first portion 181 to be configured separately from each other, or to be formed of respective materials different from each other. In this case, for example, by forming the first continuing part 186 with a material having high thermal conductivity, it is possible to efficiently transfer the heat of the first heat sources 183 to the second portion 182 via the first continuing part 186.

Figure 7:
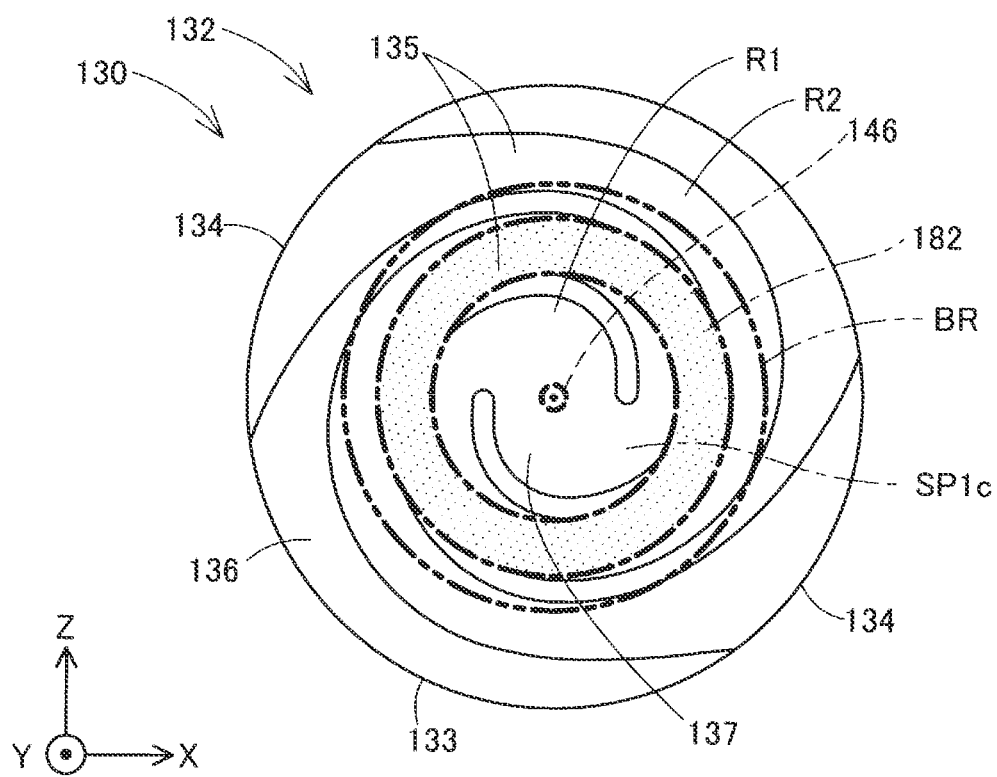
FIG. 7 is a diagram for explaining a position where a second portion overlaps the groove forming surface.

FIG. 7 is a diagram for explaining a position where the second portion 182 overlaps the groove forming surface 132. In FIG. 7, there is shown a condition when viewing the groove forming surface 132 from the barrel 140 side along the Y direction as the axial direction. In FIG. 7, the position where the groove forming surface 132 and the communication hole 146 overlap each other when viewed along the axial direction is represented by a dotted line, and the position where the groove forming surface 132 and the second portion 182 overlap each other is represented by the dashed-dotted lines and the halftone-dot hatching. It should be noted that the retention inhibition part 138 is omitted in FIG. 7 in order to make it easy to understand the configuration.

As shown in FIG. 7, the second portion 182 has a shape surrounding the communication hole 146 when viewed along the Y direction as the axial direction. Specifically, the second portion 182 in the present embodiment has a ring-like shape when viewed along the Y direction. The communication hole 146 is disposed inside the ring of the second portion 182 when viewed along the Y direction. As described above, since the heat of the first heat sources 183 is transferred to the opposed surface 142 of the barrel 140 via the second portion 182, the thermal distribution in the opposed surface 142 becomes the distribution surrounding the center of the communication hole 146 when viewed along the Y direction. Thus, the temperature unevenness in the circumferential direction of the rotor 130 is suppressed in the opposed surface 142.

As shown in FIG. 7, the groove forming surface 132 in the present embodiment has a first area R1 and a second area R2. The second area R2 is an area farther from the communication hole 146 than the first area R1 when viewed along the Y direction as the axial direction. Specifically, when viewing the groove forming surface 132 along the Y direction, an area inside the boundary BR in the groove forming surface 132 corresponds to the first area R1, and an area outside the boundary BR corresponds to the second area R2. As shown in FIG. 7, the second portion 182 overlaps the first area R1, but does not overlap the second area R2 when viewed along the Y direction. Thus, since the heat of the first heat sources 183 is more easily transferred via the second portion 182 to a portion of the opposed surface 142 overlapping the first area R1 when viewing the opposed surface 142 along the Y direction than to a portion of the opposed surface 142 overlapping the second area R2, the temperature of the portion of the opposed surface 142 overlapping the first area R1 is apt to become high. Therefore, when plasticizing the material, the fluidity of the material in the peripheral portion of the rotor 130 is easily kept lower than the fluidity of the material in the central part 137 of the rotor 130, and thus, the conveying force for conveying the material toward the center of the rotor 130 is easily obtained between the rotor 130 and the barrel 140.

According to the plasticizing device 120 described hereinabove, there is adopted the configuration in which the heat by the first heat sources 183 housed in the first portion 181 is transferred to the material between the rotor 130 and the barrel 140 via the second portion 182 which has the shape of surrounding the communication hole 146 when viewed along the axial direction. Thus, since the thermal distribution between the rotor 130 and the barrel 140 becomes the distribution corresponding to the shape of the second portion 182 surrounding the communication hole 146 when viewed along the axial direction, the temperature unevenness in the circumferential direction of the rotor 130 is easily suppressed. Therefore, the plasticization state and the amount of the plasticized material to be formed are stabilized.

Further, in the present embodiment, the second portion 182 has the ring-like shape when viewed along the axial direction. Therefore, between the rotor 130 and the barrel 140, the temperature unevenness in the circumferential direction of the rotor 130 is further suppressed, and thus, the plasticization state and the amount of the plasticized material to be formed are further stabilized.

Further, in the present embodiment, the first heat sources 183 are each the rod-like heater. Thus, even when the first heat sources 183 each have the rod-like shape, the thermal distribution between the rotor 130 and the barrel 140 becomes the distribution corresponding to the shape of the second portion 182. Therefore, it is possible to reduce the cost necessary for procurement of the first heat sources 183, and at the same time, it is possible to suppress the temperature unevenness in the circumferential direction of the rotor 130 between the rotor 130 and the barrel 140.

Further, in the present embodiment, between the first portion 181, and the rotor 130 and the barrel 140, there is disposed the heat-insulating part 187. Thus, the heat of the first heat sources 183 housed in the first portion 181 becomes easier to be transferred to an area between the rotor 130 and the barrel 140 via the second portion 182. Therefore, between the rotor 130 and the barrel 140, the temperature unevenness in the circumferential direction of the rotor 130 is further suppressed, and thus, the plasticization state and the amount of the plasticized material to be formed are further stabilized.

Further, in the present embodiment, the heat-insulating part 187 is provided with the air gap. Therefore, it is possible to prevent the heat transfer between the first portion 181, and the rotor 130 and the barrel 140 by a simple configuration.

Further, in the present embodiment, the second portion 182 of the first heating section 180 and the first area R1 of the groove forming surface 132 overlap each other, but the second portion 182 and the second area R2 of the groove forming surface 132 do not overlap each other when viewed along the axial direction. Thus, when plasticizing the material, the temperature of a portion overlapping the first area R1 when viewed along the axial direction is apt to become higher than the temperature of a portion overlapping the second area R2 between the rotor 130 and the barrel 140. Therefore, between the rotor 130 and the barrel 140, the fluidity of the material in the outer circumferential portion of the rotor 130 is apt to be kept lower than the fluidity of the material in the central part of the rotor 130. Therefore, it is easy to obtain the conveying force for conveying the material toward the center of the rotor 130, and thus, the amount of the plasticized material to be formed is further stabilized.

Further, in the injection molding device 100 according to the present embodiment, the injection nozzle 156 is surrounded by the first portion 181 in at least a part of the injection nozzle 156 in the axial direction thereof. Therefore, by warming the injection nozzle 156 with the first heating section 180, it is possible to keep the fluidity of the plasticized material inside the injection nozzle 156 to improve the molding accuracy of the molded object.

B. Second Embodiment

Figure 8:
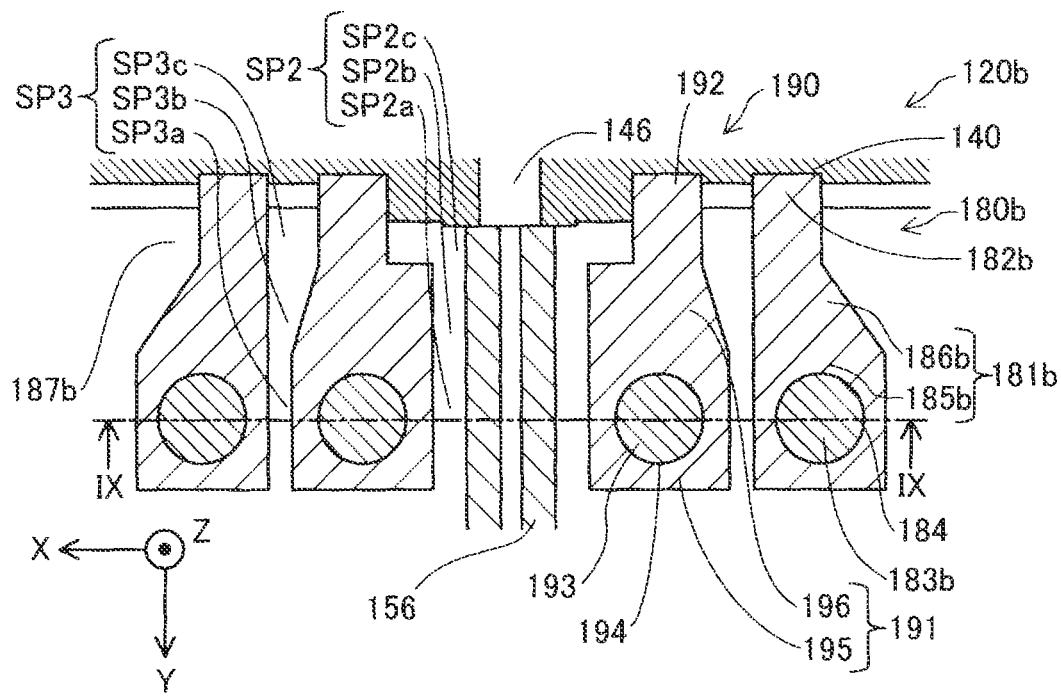
FIG. 8 is a diagram showing a cross-sectional surface of a first heating section and a second heating section in a second embodiment.
Figure 9:
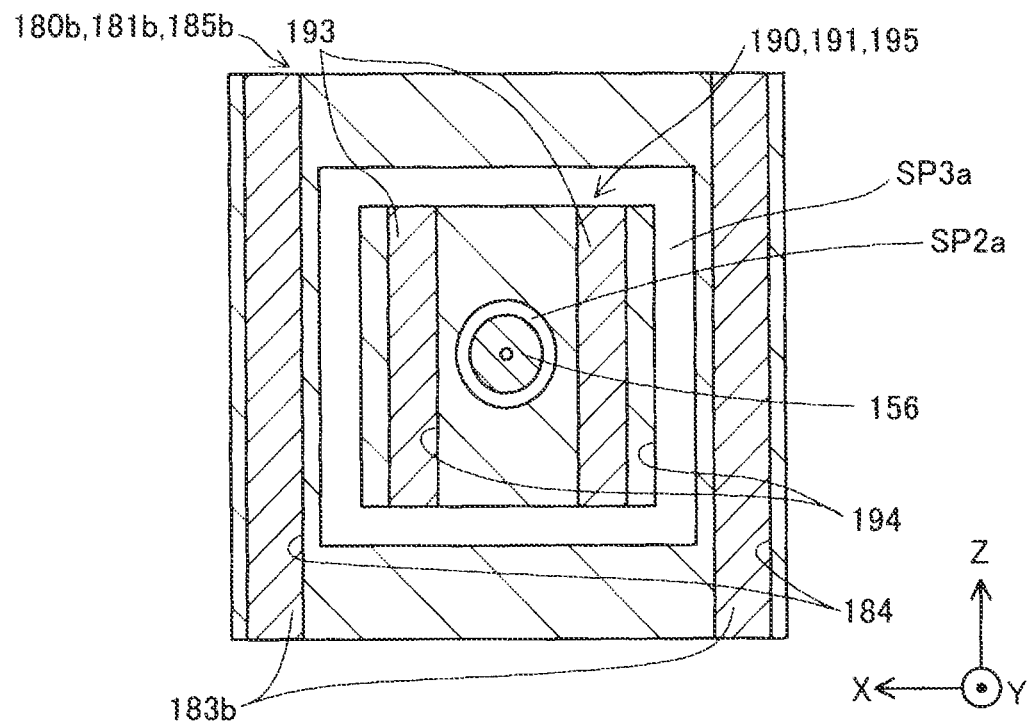
FIG. 9 is a cross-sectional view of the first heating section and the second heating section in the IX-IX cross-sectional line in FIG. 8.

FIG. 8 is a diagram showing a cross-sectional surface of a first heating section 180b and a second heating section 190 in a second embodiment. FIG. 9 is a cross-sectional view of the first heating section 180b and the second heating section 190 in the IX-IX cross-sectional line in FIG. 8. As shown in FIG. 8 and FIG. 9, the plasticizing device 120b according to the present embodiment is provided with the second heating section 190 in addition to the first heating section 180b. It should be noted that in the configuration of the injection molding device 100 and the plasticizing device 120b according to the second embodiment, a portion not particularly described is substantially the same as in the first embodiment.

In the present embodiment, unlike the first embodiment, a first portion 181b has a space SP3a which penetrates a first housing part 185b in the Y direction, and has a substantially quadrangular prismatic shape, and a space SP3b which penetrates a first continuing part 186b in the Y direction, and has a substantially cylindrical shape, and a second portion 182b has a space SP3c which penetrates the second portion 182b in the Y direction, and has a substantially cylindrical shape. The space SP3a, the space SP3b, and the space SP3c form a space SP3 which penetrates the first heating section 180b in the Y direction.

First heat sources 183b are housed in the first housing part 185b of the first portion 181b similarly to the first embodiment. As shown in FIG. 8, in the present embodiment, the first housing part 185b is provided with the two first through holes 184, and the first heat sources 183b as the rod-like heaters are inserted one-by-one into the respective first through holes 184.

The second heating section 190 has a third portion 191, a fourth portion 192, and second heat sources 193. As shown in FIG. 8 and FIG. 9, the second heating section 190 in the present embodiment is disposed so as to be surrounded by the first heating section 180b. Specifically, the second heating section 190 is disposed inside the space SP3 described above. Further, as shown in FIG. 8 and FIG. 9, the first heating section 180b and the second heating section 190 in the present embodiment are disposed via a gap with each other. Thus, the heat transfer between the first heating section 180b and the second heating section 190 is suppressed. It is possible to dispose a thermal insulation material such as glass wool between the first heating section 180b and the second heating section 190.

The third portion 191 houses the second heat sources 193. Specifically, the third portion 191 has a second housing part 195 and a second continuing part 196. The second housing part 195 is a portion for housing the second heat sources 193. The second continuing part 196 is a portion for connecting the second housing part 195 of the third portion 191 and the fourth portion 192. In other words, in the present embodiment, the third portion 191 and the fourth portion 192 connect to each other via the second continuing part 196.

The second housing part 195 of the third portion 191 in the present embodiment has a flat quadrangular prismatic shape low in height along the Y direction as the axial direction. As shown in FIG. 8 and FIG. 9, the second housing part 195 is provided with two second through holes 194 penetrating the second housing part 195 in the Z direction. The two second through holes 194 each have a substantially cylindrical shape, and are arranged along the X direction. Further, in a central portion of the second housing part 195 when viewing the second housing part 195 in the Y direction, there is formed a space SP2a which has a substantially cylindrical shape and penetrates the second housing part 195 in the Y direction.

Between the third portion 191, and the barrel 140 and the rotor 130, there is disposed an air gap, and thus, the third portion 191 is disposed at the +Y direction side of the barrel 140 without having contact with the barrel 140.

The second heat sources 193 are each a heat source of the second heating section 190 wherein the heat sources are housed in the third portion 191. In the present embodiment, the second heat sources 193 are housed in the second housing part 195. As shown in FIG. 8 and FIG. 9, the second heat sources 193 in the present embodiment is each a rod-like heater similarly to the first heat sources 183b. The second heat sources 193 each have a substantially cylindrical shape corresponding to the shape of the second through hole 194 described above, and are inserted one-by-one into the respective second through holes 194. In the present embodiment, the output of the second heat sources 193 is controlled by the control section 500. It should be noted that the length in the Z direction of the second through hole 194 in the present embodiment is shorter than the length in the Z direction of the first through hole 184, and the length in the Z direction of the second heat source 193 is shorter than the length in the Z direction of the first heat source 183b. Further, it is possible to adopt a configuration in which, for example, the second heat sources 193 are detachably attached to the second housing part 195.

The fourth portion 192 has a flat substantially cylindrical shape low in height along the Y direction as the axial direction. In a central portion of the fourth portion 192 when viewing the fourth portion 192 along the Y direction, there is formed a space SP2c which has a substantially cylindrical shape and penetrates the fourth portion 192 in the Y direction. As shown in FIG. 8, the fourth portion 192 is a portion disposed closer to the groove forming surface 132 than the third portion 191 in the Y direction as the axial direction. As shown in FIG. 8, the fourth portion 192 in the present embodiment is partially embedded in the barrel 140 to thereby be fixed similarly to the second portion 182b.

The second continuing part 196 is a portion disposed between the third portion 191 and the fourth portion 192, and has a substantially circular truncated conical shape. In a central portion of the second continuing part 196 when viewing the second continuing part 196 along the Y direction, there is formed a space SP2b which has a substantially cylindrical shape and penetrates the second continuing part 196 in the Y direction.

As shown in FIG. 8, the second heating section 190 is provided with a space SP2 penetrating the second heating section 190 in the Y direction. Specifically, the space SP2a and the space SP2b provided to the third portion 191 and the space SP2c provided to the fourth portion 192 are communicated with each other to thereby form the space SP2. In the present embodiment, in this space SP2, there is inserted the injection nozzle 156. It should be noted that as shown in FIG. 9, between the injection nozzle 156 and the second heating section 190, there is formed a gap.

The second heating section 190 in the present embodiment is constituted by the third portion 191 and the fourth portion 192 integrally formed of stainless steel. In another embodiment, the second heating section 190 can be formed of other metal such as aluminum. Further, the third portion 191 and the fourth portion 192 can be formed separately from each other, or can also be formed of respective materials different from each other. Similarly, it is possible for the second housing part 195 and the second continuing part 196 constituting the third portion 191 to be configured separately from each other, or to be formed of respective materials different from each other.

The second heating section 190 is configured to transfer the heat by the second heat sources 193 to the material fed between the rotor 130 and the barrel 140 via the fourth portion 192 due to the configuration described above. Specifically, the heat by the second heat sources 193 is first transferred to the third portion 191 which houses the second heat sources 193. The heat transferred to the third portion 191 is transferred to the fourth portion 192. The heat transferred to the fourth portion 192 is transferred to the barrel 140, and is further transferred to the opposed surface 142 of the barrel 140. Thus, the heat by the second heat sources 193 is transferred to the material fed between the rotor 130 and the barrel 140.

It should be noted that as described above, since the gap is disposed between the third portion 191, and the barrel 140 and the rotor 130 in the present embodiment, the heat transfer from the second heat sources 193 to the material between the rotor 130 and the barrel 140 without the intervention of the fourth portion 192 is suppressed.

Figure 10:
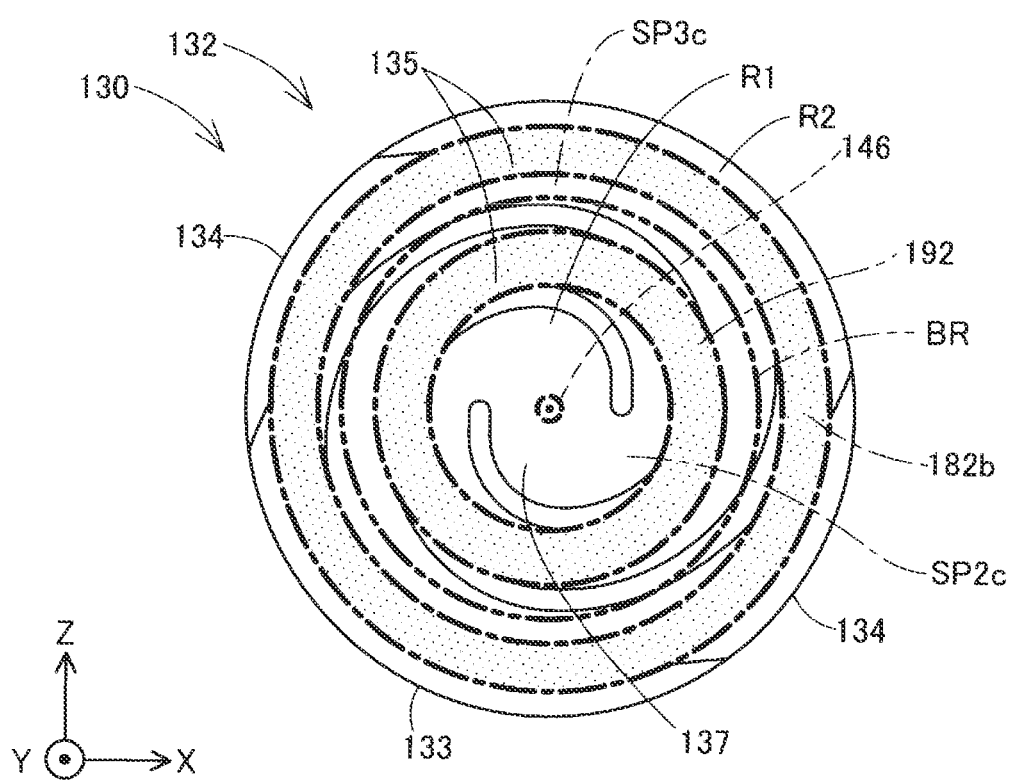
FIG. 10 is a diagram for explaining positions where a second portion and a fourth portion respectively overlap the groove forming surface.

FIG. 10 is a diagram for explaining positions where the second portion 182b and the fourth portion 192 respectively overlap the groove forming surface 132. In FIG. 10, there is shown a condition when viewing the groove forming surface 132 from the barrel 140 side along the Y direction as the axial direction similarly to FIG. 7. In FIG. 10, the position where the communication hole 146 overlaps and the position where the second portion 182b overlaps are shown similarly to FIG. 7, and in addition, the position where the fourth portion 192 overlaps is represented by the dashed-dotted lines and the halftone-dot hatching.

As shown in FIG. 10, the fourth portion 192 has a shape surrounding the communication hole 146 of the barrel 140 when viewed along the Y direction as the axial direction similarly to the second portion 182b. Further, the fourth portion 192 is located at a position closer to the communication hole 146 than the second portion 182b when viewed along the Y direction. Specifically, in the present embodiment, the second portion 182b has a ring-like shape which overlaps the second area R2 of the groove forming surface 132 but does not overlap the first area R1, and the fourth portion 192 has a ring-like shape which overlaps the first area R1 but does not overlap the second area R2. Further, the communication hole 146 is disposed inside the ring of the fourth portion 192 when viewed along the Y direction, and the fourth portion 192 surrounding the communication hole 146 is disposed inside the ring of the second portion 182b when viewed along the Y direction.

The first heat sources 183b of the first heating section 180b described above and the second heat sources 193 of the second heating section 190 are configured to be able to individually be controlled. The first heat sources 183b and the second heat sources 193 are individually controlled by the control section 500. As described above, in the present embodiment, the heat of the first heat sources 183b is transferred to the opposed surface 142 of the barrel 140 via the second portion 182b, and the heat of the second heat sources 193 is transferred to the opposed surface 142 via the fourth portion 192. Therefore, it is possible for the control section 500 to make the temperature of, for example, a portion close to the central part 137 of the rotor 130 higher than the temperature of a portion far from the central part 137 of the rotor 130 in an area between the rotor 130 and the barrel 140 by individually controlling the first heat sources 183b and the second heat sources 193. It should be noted that it is possible for the control section 500 to obtain the temperature of, for example, the portion overlapping the first area R1 of the opposed surface 142 and the portion overlapping the second area R2 using a temperature sensor formed of a thermocouple or the like and then control the first heat sources 183b and the second heat sources 193 in accordance with the temperature thus obtained.

According also to the plasticizing device 120b related to the second embodiment described hereinabove, between the rotor 130 and the barrel 140, the temperature unevenness in the circumferential direction of the rotor 130 is suppressed, and thus, the plasticization state and the amount of the plasticized material to be formed are stabilized. In particular, in the present embodiment, the fourth portion 192 of the second heating section 190 is located at the position closer to the communication hole 146 than the second portion 182b of the first heating section 180b when viewed along the axial direction, and the first heat sources 183b of the first heating section 180b and the second heat sources 193 of the second heating section 190 are configured to be able to individually be controlled. Thus, it is possible to make the temperature of a portion closer to the central part 137 of the rotor 130 different from the temperature of a portion farther from the central part 137 in the area between the rotor 130 and the barrel 140 by individually controlling the first heat sources 183b and the second heat sources 193. Therefore, for example, by controlling the temperature of the portion closer to the central part 137 of the rotor 130 to be higher than the temperature of the portion farther from the central part 137, it is possible to further stabilize the amount of the plasticized material to be formed.

It should be noted that in the second embodiment, the third portion 191 of the second heating section 190 is located at a position closer to the communication hole 146 than the first portion 181b of the first heating section 180b when viewed along the axial direction. In contrast, in another embodiment, the third portion 191 is not required to be located at a position closer to the communication hole 146 than the first portion 181b when viewed along the axial direction. For example, it is possible to adopt a configuration in which the second heating section 190 is inserted from the −Y direction side with respect to the first heating section 180b, and the third portion 191 which is formed so as to be larger in size than the first portion 181b in the X direction and the Y direction is located at the −Y direction side of the first portion 181b. Even in this case, since the fourth portion 192 of the second heating section 190 is located at the position closer to the communication hole 146 than the second portion 182b of the first heating section 180b when viewed along the axial direction, and the first heat sources 183b and the second heat sources 193 are configured to be able to individually be controlled, it is possible to further stabilize the amount of the plasticized material to be formed.

C. Third Embodiment

Figure 11:
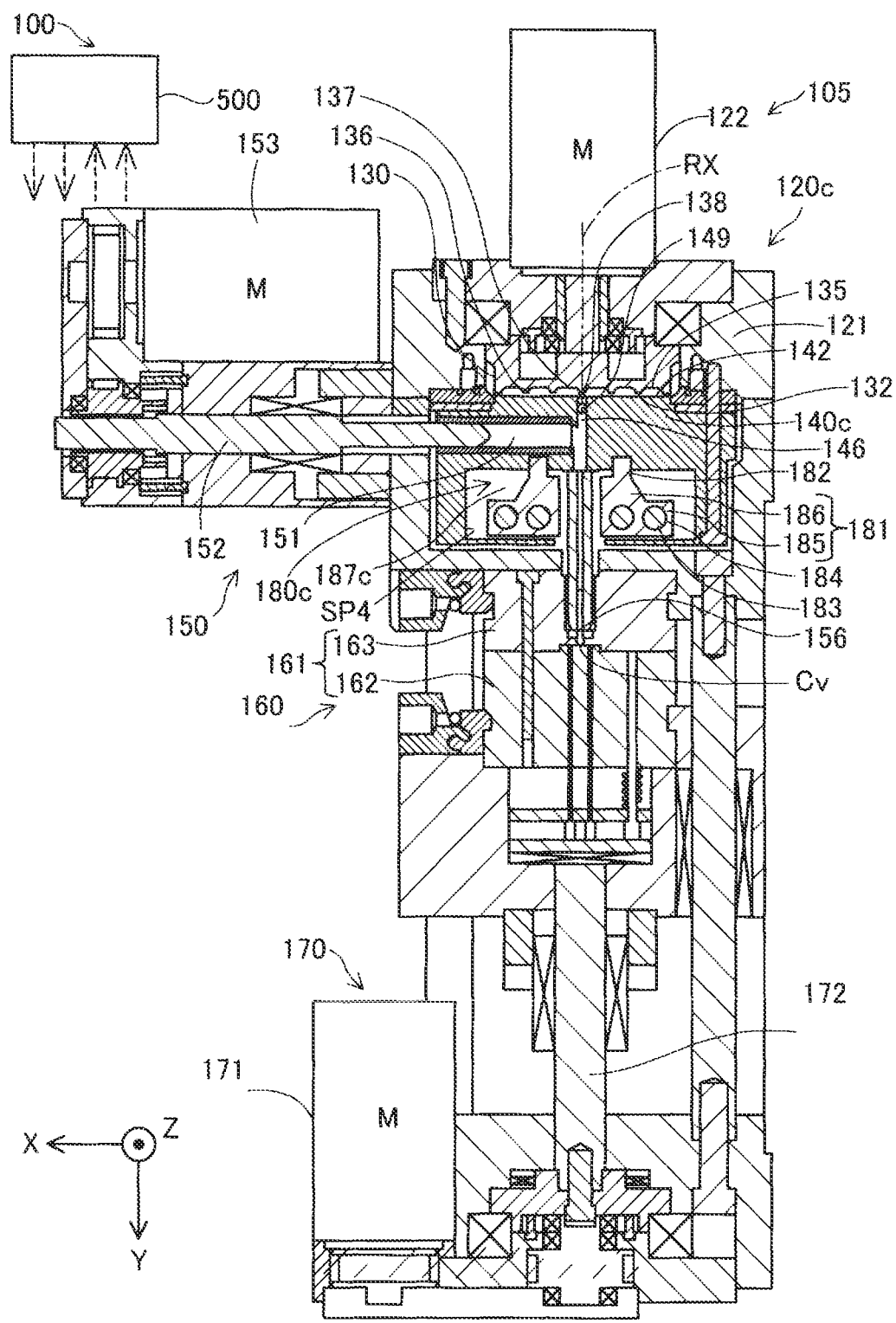
FIG. 11 is a cross-sectional view showing a schematic configuration of an injection molding device according to a third embodiment.

FIG. 11 is a cross-sectional view showing a schematic configuration of an injection molding device 100 according to a third embodiment. A first heating section 180c in the present embodiment is disposed inside a barrel 140c unlike the first embodiment. It should be noted that in the configuration of the injection molding device 100 and the plasticizing device 120c according to the third embodiment, a portion not particularly described is substantially the same as in the first embodiment.

The barrel 140c in the present embodiment is provided with a space SP4. The space SP4 is a space which is formed inside the barrel 140c, and has a substantially cylindrical shape. The first heating section 180c in the present embodiment is disposed inside the space SP4. Between the first portion 181 of the first heating section 180c and the barrel 140c, there is disposed a heat-insulating part 187c similarly to the first embodiment. Specifically, the heat-insulating part 187c in the present embodiment is disposed so as to cover the outer edge of the first portion 181. The heat-insulating part 187c in the present embodiment is formed of a heat insulating material such as glass wool. It should be noted that the heat-insulating part 187c can be provided with an air gap similarly to, for example, the first embodiment.

According also to the plasticizing device 120c related to the third embodiment described hereinabove, the temperature unevenness in the circumferential direction of the rotor 130 is suppressed, and thus, the plasticization state and the amount of the plasticized material to be formed are stabilized. In particular, in the present embodiment, even when disposing the first heating section 180c in the barrel 140c, it is possible to stabilize the plasticization state and the amount of the plasticized material to be formed.

D. Fourth Embodiment

Figure 12:
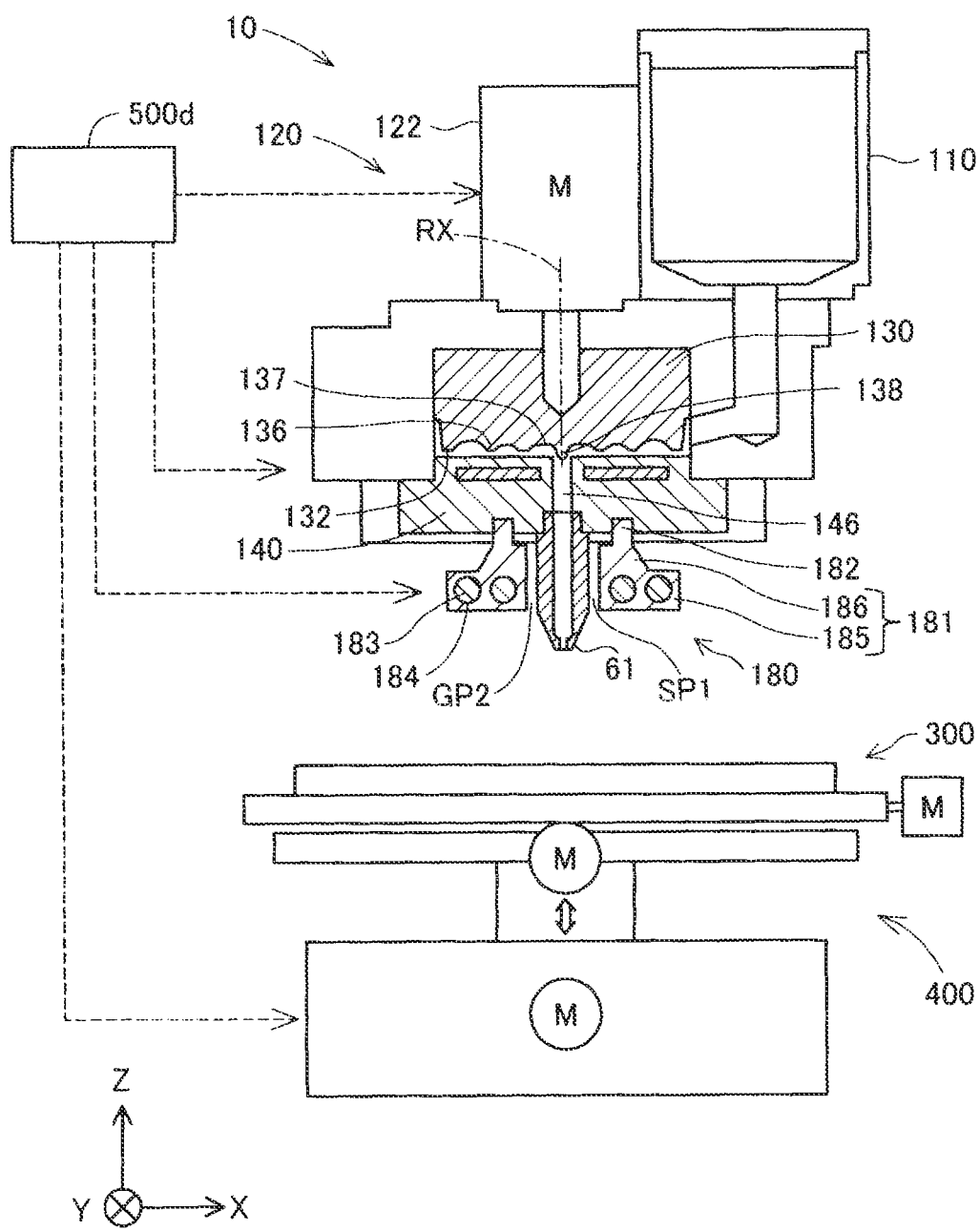
FIG. 12 is a diagram showing a schematic configuration of a three-dimensional modeling device as a fourth embodiment.

FIG. 12 is an explanatory diagram showing a schematic configuration of a three-dimensional modeling device as a fourth embodiment. The three-dimensional modeling device 10 is provided with an ejection nozzle 61, the material feeding section 110, the plasticizing device 120, a stage 300, a displacement mechanism 400, and a control section 500d. The three-dimensional modeling device 10 according to the present embodiment plasticizes the material fed from the material feeding section 110 with the plasticizing device 120, and then ejects the material thus plasticized toward the stage 300 from the ejection nozzle 61.

The displacement mechanism 400 is configured to be able to change a relative position between the ejection nozzle and the stage 300. In the present embodiment, the displacement mechanism 400 displaces the stage 300 without displacing the ejection nozzle 61. The displacement mechanism 400 is formed of a triaxial positioner for moving the stage 300 in triaxial directions, namely the X, Y, and Z directions with driving forces of three motors. The displacement mechanism 400 is controlled by the control section 500d. It should be noted that in another embodiment, it is possible to displace the ejection nozzle 61 without displacing the stage 300 to thereby change the relative position between the ejection nozzle 61 and the stage 300. Further, it is also possible for the displacement mechanism 400 to displace both of the ejection nozzle 61 and the stage 300.

The control section 500d is formed of a computer or the like similarly to the control section 500. The control section 500d controls the displacement mechanism 400 and the plasticizing device 120 in accordance with modeling data obtained in advance to thereby eject the material thus plasticized at an arbitrary position on the stage 300 from the ejection nozzle 61, and thus, models a three-dimensional shaped article. It should be noted that the three-dimensional shaped article is also referred to simply as a shaped article in some cases.

The plasticizing device 120 is provided with the drive motor 122, the rotor 130 rotating centering on the rotational axis due to the drive motor 122, the barrel 140, and the first heating section 180 similarly to the first embodiment. Similarly to the first embodiment, the plasticizing device 120 heats the material while conveying the material toward the communication hole 146 due to the rotation of the rotor 130 and the heating by the first heating section 180 to thereby plasticize the material, and then discharges the plasticized material from the communication hole 146. The plasticized material discharged from the communication hole 146 flows to the ejection nozzle 61.

It should be noted that the three-dimensional modeling device 10 can be provided with a nozzle heater for warming the ejection nozzle 61. By appropriately warming the ejection nozzle 61, it is possible to keep the fluidity of the plasticized material inside the ejection nozzle 61 to improve the modeling accuracy of the shaped article.

Similarly to the first embodiment, the first heating section 180 has the first portion 181, the second portion 182, and the first heat sources 183. It should be noted that the first portion 181 in the present embodiment is disposed at the −Z direction side of the barrel 140 without having contact with the barrel 140. The first housing part 185 of the first portion 181 is provided with the four first through holes 184 extending in the Y direction, and arranged along the X direction. The first heat sources 183 are respectively housed in the first through holes 184 similarly to the first embodiment.

Also in the present embodiment, similarly to the first embodiment, the first heating section 180 is configured to transfer the heat by the first heat sources 183 to the material fed between the rotor 130 and the barrel 140 via the second portion 182.

It should be noted that as shown in FIG. 12, in the present embodiment, in the space SP1 of the first heating section 180, there is inserted the ejection nozzle 61. Therefore, the periphery of the ejection nozzle 61 is surrounded by the first portion 181 in a part in the Z direction as the axial direction. Thus, since the heat of the first heat sources 183 housed in the first portion 181 is transferred to the ejection nozzle 61, it is possible to warm the ejection nozzle 61 with the heat of the first heat sources 183. Further, for example, even when a nozzle heater for warming the ejection nozzle 61 is provided, since it is possible to warm the ejection nozzle 61 while suppressing the output of the nozzle heater, it is possible to enhance the overall thermal efficiency of the three-dimensional modeling device 10. It should be noted that in the present embodiment, between the ejection nozzle 61 and the first portion 181, there is disposed a gap Gp2. By providing the gap Gp2, excessive thermal transfer from the first heating section 180 to the ejection nozzle 61 is prevented, and thus, the temperature of the ejection nozzle 61 is prevented from excessively rising.

According to the three-dimensional modeling device related to the fourth embodiment described hereinabove, there is provided the plasticizing device 120 similarly to the first embodiment, and the plasticizing device 120 is configured so that the heat by the first heat sources 183 housed in the first portion 181 is transferred to the material between the rotor 130 and the barrel 140 via the second portion 182 which has the shape of surrounding the communication hole 146 when viewed in the axial direction. Thus, since the thermal distribution between the rotor 130 and the barrel 140 becomes the distribution corresponding to the second portion 182 surrounding the communication hole 146 when viewed along the axial direction, the temperature unevenness in the circumferential direction of the rotor 130 is easily suppressed. Therefore, the plasticization state and the amount of the plasticized material are stabilized.

Further, in the three-dimensional modeling device 10 according to the present embodiment, the periphery of the ejection nozzle 61 is surrounded by the first portion 181 in at least a part of the ejection nozzle 61 in the axial direction thereof. Therefore, by warming the ejection nozzle 61 with the first heating section 180, it is possible to keep the fluidity of the plasticized material inside the ejection nozzle 61 to improve the modeling accuracy of the shaped article.

E. Other Embodiments (E-1) In the embodiments described above, the first heating section 180 is provided to the barrel 140. In contrast, it is possible for the first heating section 180 to be provided to the rotor 130 instead of the barrel 140. For example, it is possible for the first heating section 180 to be disposed so that a part of the second portion 182 has contact with the rotor 130, or so that the second portion 182 is embedded in the rotor 130. Further, it is possible for the first heating section 180 to be disposed inside the rotor 130. In this case, the heat by the first heat sources 183 is transferred via the second portion 182 to the rotor 130, and is further transferred to the groove forming surface 132. Thus, the heat is transferred to an area between the rotor 130 and the barrel 140, and is thus transferred to the material fed between the rotor 130 and the barrel 140.

(E-2) In the embodiments described above, the second portion 182 has the ring-like shape when viewed along the axial direction. In contrast, the second portion 182 is not required to have the ring-like shape when viewed along the axial direction. For example, the outer circumferential edge or the inner circumferential edge of the second portion 182 when viewing the second portion 182 along the axial direction can be formed of a polygon having three or more vertexes. Further, the shape of the outer circumferential edge or the inner circumferential edge of the second portion 182 when viewing the second portion 182 along the axial direction can be, for example, a shape obtained by combining straight lines and curved lines with each other. Further, the outer circumferential edge and the inner circumferential edge of the second portion 182 when viewing the second portion 182 in the axial direction are not required to have similarity shapes. It should be noted that in a similar way, the fourth portion 192 is not required to have a ring-like shape when viewed along the axial direction.

(E-3) In the embodiments described above, the first heat sources 183 are each the rod-like heater. In contrast, the first heat sources 183 are not required to be the rod-like heater. The first heat source 183 can be, for example, a heater having a different shape. Similarly, the second heat sources 193 are not required to be the rod-like heater.

(E-4) In the embodiments described above, between the first portion 181, and the rotor 130 and the barrel 140, there is disposed the air gap as the heat-insulating part 187. In contrast, the heat-insulating part 187 is not required to be provided with the air gap. For example, it is possible for the heat-insulating part 187 to be formed of a heat insulating material such as glass wool for insulating the first portion 181 from the rotor 130 and the barrel 140. Further, the heat-insulating part 187 is not required to be disposed between the first portion 181, and the rotor 130 and the barrel 140, and it is also possible for the first portion 181 to have direct contact with the rotor 130 or the barrel 140.

(E-5) In the embodiments described above, the second portion 182 overlaps the first area R1, but does not overlap the second area R2 when viewed along the axial direction. In contrast, the second portion 182 is not required to overlap the first area R1, and can overlap the second area R2, for example, when viewed along the axial direction. In this case, it is possible for the second portion 182 to be disposed so as to overlap the outer circumferential edge of the groove forming surface 132, for example, when viewed along the axial direction.

(E-6) In the embodiments described above, the periphery of the injection nozzle 156 is surrounded by the first portion 181 in at least a part of the injection nozzle 156 in the axial direction thereof. In contrast, the injection nozzle 156 is not required to be surrounded by the first portion 181. Similarly, the ejection nozzle 61 is not required to be surrounded by the first portion 181.

(E-7) In the embodiments described above, the first portion 181 has the first continuing part 186. In contrast, the first portion 181 is not required to have the first continuing part 186. For example, a portion corresponding to the first housing part 185 of the first portion 181 and the second portion 182 can directly connect to each other. Further, for example, the second portion 182 can be provided with a continuing portion for connecting the first portion 181 and the second portion 182 to each other, and the first portion 181 and the second portion 182 can connect to each other with the continuing portion. Similarly, the third portion 191 is not required to have the second continuing part 196.

F. Other Aspects

The present disclosure is not limited to the embodiments described above, but can be implemented in a variety of aspects within the scope or the spirit of the present disclosure. For example, the present disclosure can also be implemented in the following aspects. The technical features in each of the embodiments described above corresponding to the technical features in each of the aspects described below can arbitrarily be replaced or combined in order to solve some or all of the problems of the present disclosure, or to achieve some or all of the advantages of the present disclosure. Further, the technical feature can arbitrarily be eliminated unless described in the present specification as an essential element.

(1) According to a first aspect of the present disclosure, there is provided a plasticizing device including a rotor which rotates around a rotational axis, and has a groove forming surface provided with a groove, a barrel which is opposed to the groove forming surface, and has a communication hole, and a first heating section configured to heat a material fed between the rotor and the barrel, wherein the material fed between the rotor and the barrel is plasticized and discharged from the communication hole due to a rotation of the rotor and heating by the first heating section. In the plasticizing device, the first heating section includes a first portion configured to house a first heat source, includes a second portion which is disposed closer to the groove forming surface than the first portion in an axial direction of the rotational axis, which has a shape surrounding the communication hole when viewed along the axial direction, and which connects to the first portion, and is configured so that heat by the first heat source is transferred to the material between the rotor and the barrel via the second portion.

According to such an aspect as described above, since the thermal distribution between the rotor and the barrel becomes the distribution corresponding to the shape of the second portion surrounding the communication hole when viewed along the axial direction, the temperature unevenness in the circumferential direction of the rotor is easily suppressed. Therefore, the plasticization state and the amount of the plasticized material to be formed are stabilized.

(2) In the plasticizing device according to the aspect described above, the second portion may have a ring-like shape when viewed along the axial direction. According to such an aspect as described above, between the rotor and the barrel, the temperature unevenness in the circumferential direction of the rotor is further suppressed, and thus, the plasticization state and the amount of the plasticized material to be formed are further stabilized.

(3) In the plasticizing device according to the aspect described above, the first heat source may be a rod-like heater. According to such an aspect as described above, even when the first heat source has the rod-like shape, the thermal distribution between the rotor and the barrel becomes the distribution corresponding to the shape of the second portion. Therefore, it is possible to reduce the cost necessary for procurement of the first heat source, and at the same time, it is possible to suppress the temperature unevenness in the circumferential direction of the rotor between the rotor and the barrel.

(4) In the plasticizing device according to the aspect described above, there may further be included a heat-insulating part disposed between the first portion, and the rotor and the barrel. According to such an aspect as described above, the heat of the first heat source housed in the first portion becomes easier to be transferred to an area between the rotor and the barrel via the second portion. Therefore, between the rotor and the barrel, the temperature unevenness in the circumferential direction of the rotor is further suppressed, and thus, the plasticization state and the amount of the plasticized material to be formed are further stabilized.

(5) In the plasticizing device according to the aspect described above, the heat-insulating part may be provided with an air gap. According to such an aspect as described above, it is possible to prevent the heat transfer between the first portion, and the rotor and the barrel by a simple configuration.

(6) In the plasticizing device according to the aspect described above, the groove forming surface may include a first area, and a second area farther from the communication hole than the first area, and the second portion may overlap the first area, and may fail to overlap the second area when viewed along the axial direction. According to such an aspect as described above, when plasticizing the material, since the temperature of the portion overlapping the first area when viewed along the axial direction is apt to become higher than the temperature of the portion overlapping the second area between the rotor and the barrel, the fluidity of the material in the outer circumferential portion of the rotor is apt to be kept lower than the fluidity of the material in the central part of the rotor. Therefore, it is easy to obtain the conveying force for conveying the material toward the center of the rotor, and thus, the amount of the plasticized material to be formed is further stabilized.

(7) In the plasticizing device according to the aspect described above, there may further be included a second heating section configured to heat the material fed between the groove and the barrel, wherein the second heating section may include a third portion configured to house a second heat source, may include a fourth portion which is disposed closer to the groove forming surface than the third portion in the axial direction, which has a shape surrounding the communication hole when viewed along the axial direction, and which connects to the third portion, and may be configured so that heat by the second heat source is transferred to the material fed between the groove and the barrel via the fourth portion, the fourth portion may be located at a position closer to the communication hole than the second portion when viewed along the axial direction, and the first heat source and the second heat source may be configured to individually be controlled. According to such an aspect as described above, it is possible to make the temperature of the portion closer to the central part of the rotor different from the temperature of the portion farther from the central part in the area between the rotor and the barrel by individually controlling the first heat source and the second heat source. Therefore, for example, by controlling the temperature of the portion closer to the central part of the rotor to be higher than the temperature of the portion farther from the central part, it is possible to further stabilize the amount of the plasticized material to be formed.

(8) According to a second aspect of the present disclosure, there is provided an injection molding device. The injection molding device includes the plasticizing device according to the first aspect described above, and an injection nozzle which is communicated with the communication hole, and is configured to inject the material plasticized into a molding die.

According to such an aspect as described above, since the thermal distribution between the rotor and the barrel becomes the distribution corresponding to the shape of the second portion surrounding the communication hole when viewed along the axial direction, the temperature unevenness in the circumferential direction of the rotor is easily suppressed. Therefore, the plasticization state and the amount of the plasticized material to be formed are stabilized.

(9) In the injection molding device according to the aspect described, the injection nozzle may be surrounded by the first portion in at least a part in the axial direction of the injection nozzle. According to such an aspect as described above, by warming the injection nozzle with the first heating section, it is possible to keep the fluidity of the plasticized material inside the injection nozzle to improve the molding accuracy of the molded object.

(10) According to a third aspect of the present disclosure, there is provided a three-dimensional modeling device. The three-dimensional modeling device includes the plasticizing device according to the first aspect described above, and an ejection nozzle which is communicated with the communication hole, and is configured to eject the material plasticized toward a stage.

According to such an aspect as described above, since the thermal distribution between the rotor and the barrel becomes the distribution corresponding to the shape of the second portion surrounding the communication hole when viewed along the axial direction, the temperature unevenness in the circumferential direction of the rotor is easily suppressed. Therefore, the plasticization state and the amount of the plasticized material to be formed are stabilized.

(11) In the three-dimensional modeling device according to the aspect described above, the ejection nozzle may be surrounded by the first portion in at least a part in the axial direction of the ejection nozzle. According to such an aspect as described above, by warming the ejection nozzle with the first heating section, it is possible to keep the fluidity of the plasticized material inside the ejection nozzle to improve the modeling accuracy of the shaped article.

The present disclosure is not limited to the aspects as the plasticizing device, the injection molding device, and the three-dimensional modeling device described above, but can be implemented in a variety of aspects. For example, the present disclosure can be implemented as an extrusion molding device, or a variety of devices equipped with a plasticizing device.

What is claimed is:

1. A plasticizing device comprising:

A rotor configured to rotate around a rotational axis, the rotor having a grove forming surface provided with a groove;

a barrel having a first surface and a second surface outwardly opposite to each other, the first surface facing the groove forming surface in a first direction along the rotational axis, the barrel having a communication hole therein; and a first heating assembly configured to heat a material fed between the rotor and the barrel, the first heating assembly surrounding the communication hole when viewed along the first direction, the barrel being located closer to the first heating assembly than the rotor along the first direction, the first heating assembly being configured with:

a first structure housing a first heat source therein, the first structure surrounding the communication hole by a first inner periphery of the first structure when viewed along the first direction, a second structure disposed closer to the barrel than the first structure along the first direction, the second structure abutting the first structure, the second structure surrounding the communication hole by a second inner periphery of the second structure when viewed along the first direction, wherein the material fed between the rotor and the barrel is plasticized and discharged from the communication hole due to a rotation of the rotor and heating by the first heating assembly, the second structure has a tip that is located away from the first structure along the first direction, and the tip abuts the second surface of the barrel or is embedded in the barrel, and the first inner periphery is located closer to the communication hole than the second inner periphery when viewed along the first direction.

2. The plasticizing device according to claim 1, wherein the second structure of the first heating assembly is ring-shaped when viewed along the first direction.

3. The plasticizing device according to claim 1, wherein the first heat source is a rod-shaped heater.

4. The plasticizing device according to claim 1, further comprising:

a heat-insulating part disposed between the first structure of the first heating assembly and the barrel.

5. The plasticizing device according to claim 4, wherein the heat-insulating part is provided with an air gap.

6. The plasticizing device according to claim 1, wherein the groove forming surface includes a first area, and a second area farther from the communication hole than the first area, the second structure of the first heating assembly overlaps the first area when viewed along the first direction, and the second structure of the first heating assembly is laterally shifted from the second area when viewed along the first direction.

7. The plasticizing device according to claim 1, further comprising:

a second heating assembly configured to heat the material fed between the groove and the barrel, wherein the second heating assembly includes a third structure configured to house a second heat source, includes a fourth structure which is disposed closer to the groove forming surface than the third structure along the first direction, which surrounds the communication hole when viewed along the first direction, and which connects to the third structure, and is configured so that heat by the second heat source is transferred to the material fed between the groove and the barrel via the fourth structure, the fourth structure is located at a position closer to the communication hole than the second structure of the first heating assembly when viewed along the first direction, and the first heat source and the second heat source are configured to individually be controlled.

8. An injection molding device comprising:

the plasticizing device according to claim 1; and an injection nozzle which is communicated with the communication hole, and is configured to inject the plasticized material into a molding die.

9. The injection molding device according to claim 8, wherein part of the injection nozzle is surrounded by the first structure of the first heating assembly.

10. A three-dimensional modeling device comprising:

the plasticizing device according to claim 1; and an ejection nozzle which is communicated with the communication hole, and is configured to eject the plasticized material toward a stage.

11. The three-dimensional modeling device according to claim 10, wherein part of the ejection nozzle is surrounded by the first structure of the first heating assembly.

12. The plasticizing device according to claim 1, wherein the first structure and the second structure of the first heating assembly are separately provided, and the first structure and the second structure of the first heating assembly are made of different materials each other.

13. The plasticizing device according to claim 7, wherein each of the first heat source and the second heat source is a rod-shaped heater, and a longitudinal length of the second heat source is shorter than a longitudinal length of the first heat source.

* * * * *